D. H. MURPHY.
CONDUIT FOR ELECTRIC WIRES.
APPLICATION FILED SEPT. 19, 1913.

1,254,344.

Patented Jan. 22, 1918.

WITNESSES
W. T. Holman
Elbert L. Hyde

INVENTOR
Daniel H. Murphy
By Fredk. W. Winter
Attorney

UNITED STATES PATENT OFFICE.

DANIEL HAYES MURPHY, OF PITTSBURGH, PENNSYLVANIA, ASSIGNOR TO THE AMERICAN CONDUIT MANUFACTURING COMPANY, A CORPORATION OF PENNSYLVANIA.

CONDUIT FOR ELECTRIC WIRES.

1,254,344.   Specification of Letters Patent.   Patented Jan. 22, 1918.

Application filed September 19, 1913. Serial No. 790,645.

*To all whom it may concern:*

Be it known that I, DANIEL HAYES MURPHY, a resident of Pittsburgh, in the county of Allegheny and State of Pennsylvania, have invented a new and useful Improvement in Conduits for Electric Wires, of which the following is a specification.

This invention relates to pipes, tubes, etc., and fittings therefor, and which are used for various purposes, such as conduits for wires and the like.

The object of the invention is to provide an iron or steel conduit having on either or both of its surfaces a combination coating which thoroughly protects the steel or iron against rust or corrosion by chemical reagents, and also against electrolytic action when the conduit is immersed in water.

Lead coatings, such as have been used for protecting coatings, are very resistant to all corrosive chemical agents, whether acid or alkali, and pipe coated therewith will not corrode even if pin holes are present. Lead, however, is not a good protective agent against electrolytic action and if a pipe coated therewith is immersed in water, the iron or steel base is liable to rust or be eaten away. Zinc coatings form a good protection against electrolytic action, as the zinc is electropositive to iron or steel, but zinc will not successfully withstand corrosive agents, such as acids or alkalis. While copper coatings have also been used they are too expensive if applied in amounts sufficient to afford good protection.

My invention is designed to overcome all the foregoing objections to coated conduits and provide an improved conduit having a combination coating of two different metals superposed upon each other, at least one of which is electropositive to iron or steel, and which coating thoroughly protects the iron or steel against both chemical and electrolytic action.

Figure 2:
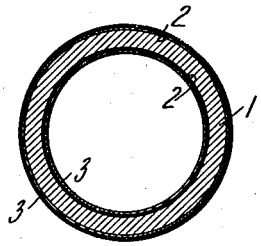
Figure 1:
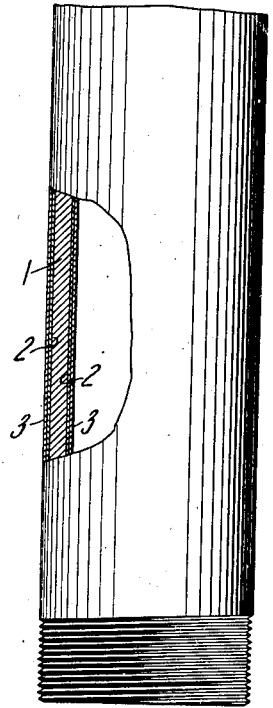

In the drawings, Figure 1 represents an elevation, partly broken out and in section, of an iron or steel tube having a coating embodying the invention; and Fig. 2 is a transverse section of said tube.

The body 1 of the tube, pipe or fitting is of iron or steel, as ordinarily. Either or both of its surfaces are provided with a combination coating consisting of two superposed layers of dissimilar metals. These layers are preferably applied electrolytically, and either layer may be on top, so long as both are used. One of the layers, such as layer 2, is formed of a cheap, non-corrodible metal, which may be electronegative or electropositive to iron or steel, and is shown as lead, which is electronegative. This layer is preferably of sufficient thickness to form an efficient protection against corrosion by chemical reagents, such as acids or alkalis.

The other layer 3 is formed of a different metal which can be readily applied either directly to the iron or steel or upon the layer 2 of lead or other metal. It is also a metal which is electropositive to iron or steel, so that in case the pipe is subjected to immersion in water, the electrolytic action causes deposition of said metal on the iron, steel or lead, and not the reverse action. One such metal is zinc, which if applied either directly to the iron or steel or to the lead wholly prevents electrolytic decomposition of the iron or steel.

The coating of the electronegative metal, such as lead, is in all cases of sufficient thickness to thoroughly protect the pipe against corrosion by acids, alkalis, or other corrosive agents. The electropositive metal, such as zinc, may be applied in layers of any thickness, but preferably is a mere flash. By its mere presence it furnishes electrolytic protection and largely prevents electrolytic decomposition of the iron or steel.

The combination coating described forms an efficient protection against corrosion or attack, while if the zinc is applied over the lead it also fills up all pin holes and scratches and generally improves and brightens the appearance of the conduit.

When only one surface of the pipe or conduit is coated as described the other surface may be left uncoated or may be provided with any other suitable or preferred coating, such as an enamel coating, which is particularly desirable for the inner surface.

What I claim is:

1. A new article of manufacture, comprising an iron or steel conduit having its surfaces provided with an acid-resisting non-corrosive combination coating comprising an electrodeposited layer of substantially pure lead and a superposed electrodeposited layer of substantially pure zinc.

2. A new article of manufacture, comprising an iron or steel conduit having one or more of its surfaces provided with an acid-resisting non-corrosive combination coating comprising an electrodeposited layer of substantially pure lead of sufficient thickness to withstand chemical corrosion, and a superposed electrodeposited layer of substantially pure zinc filling the recesses in the layer of lead and of sufficient thickness to prevent corrosion.

3. The method of providing an iron or steel conduit with an acid-resisting non-corrosive coating which will not be subject to electrolysis, which comprises electrodepositing upon the surfaces of said conduit a relatively thin layer of substantially pure lead and subsequently electrodepositing upon said lead covering a thin layer of substantially pure zinc to fill the minute recesses in the lead covering and provide a non-corrosive outer coating which will prevent electrolysis.

In testimony whereof I have hereunto set my hand.

DANIEL HAYES MURPHY.

Witnesses:
F. W. WINTER,
GLENN H. LERESCHE.